Figure 1:
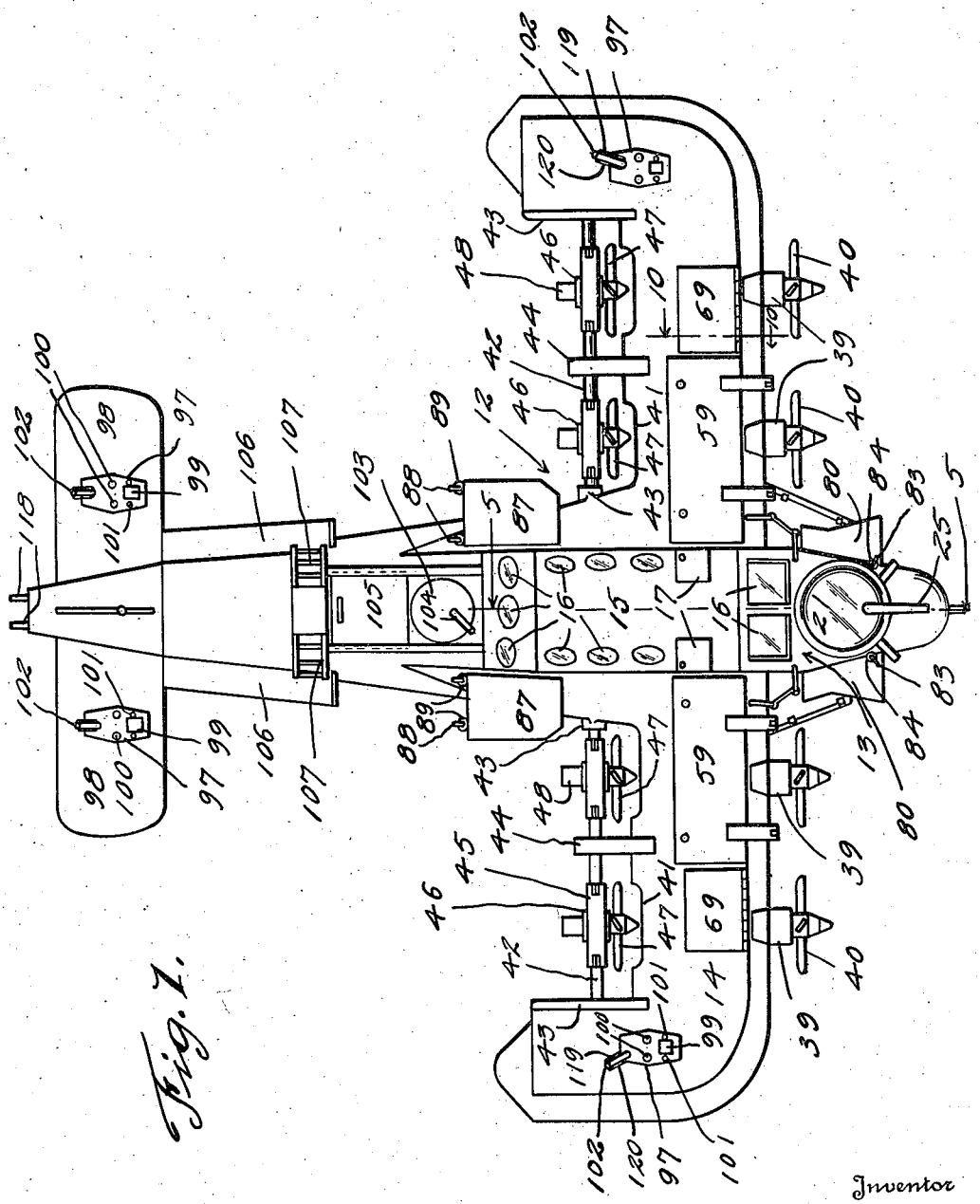

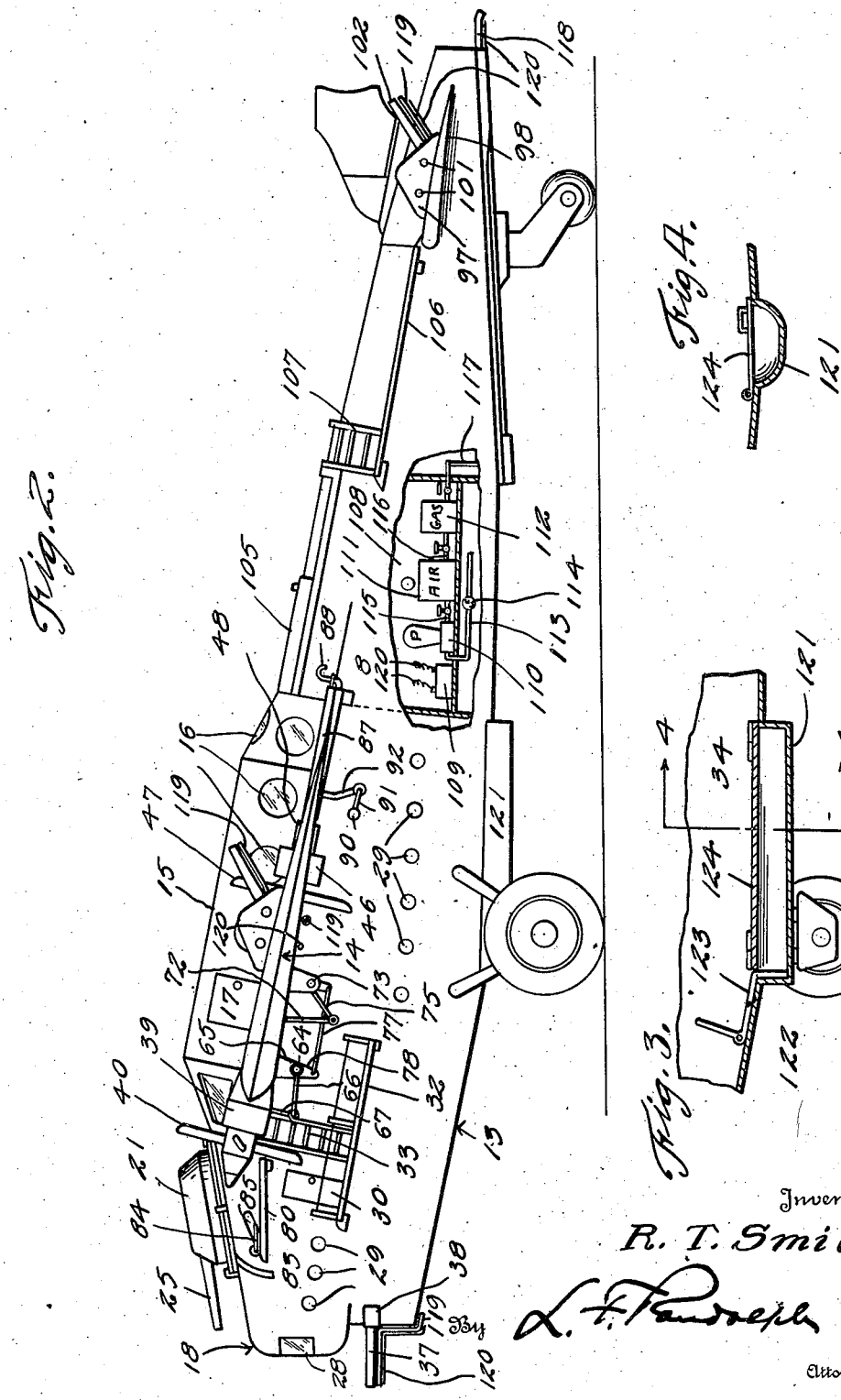

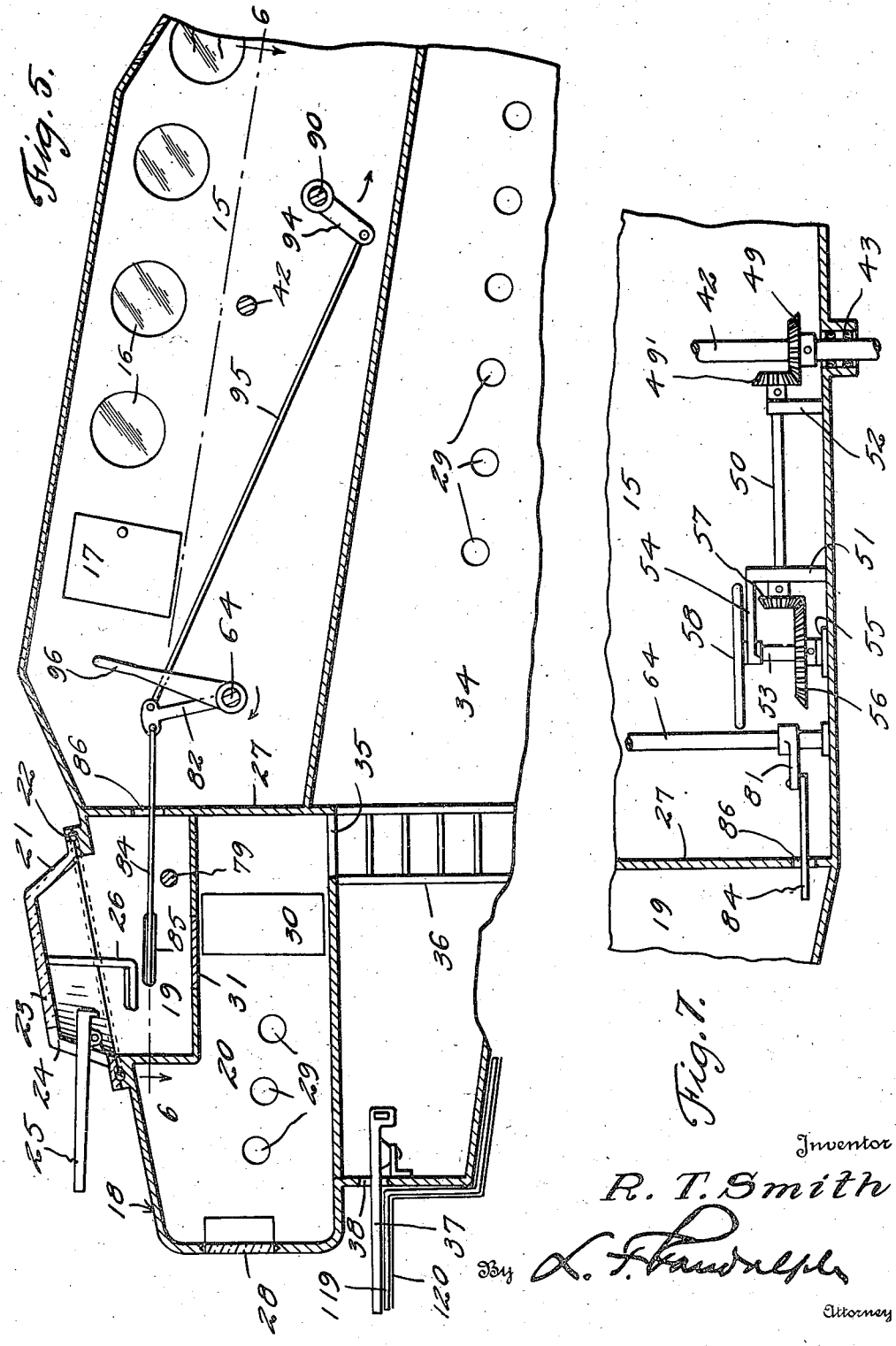

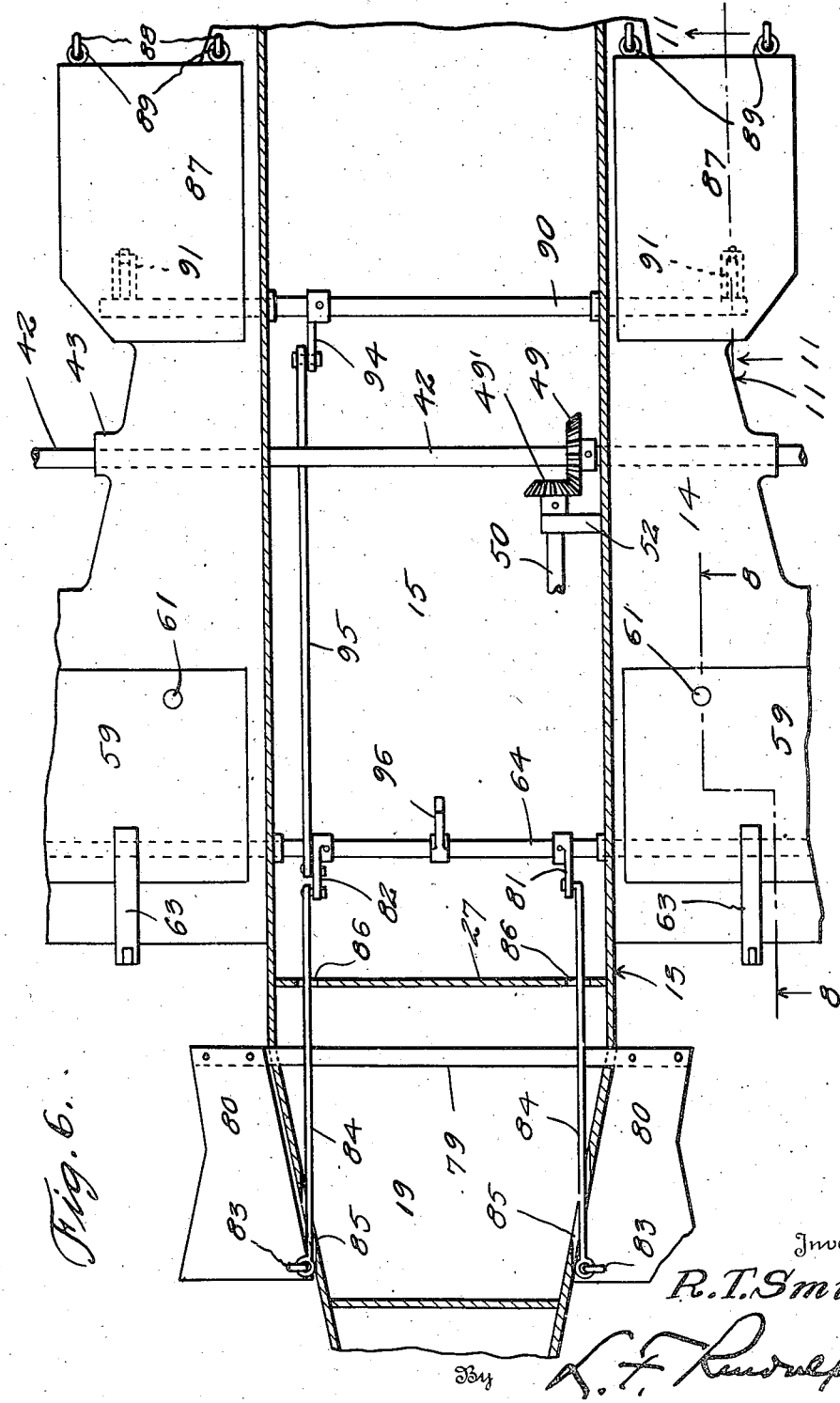

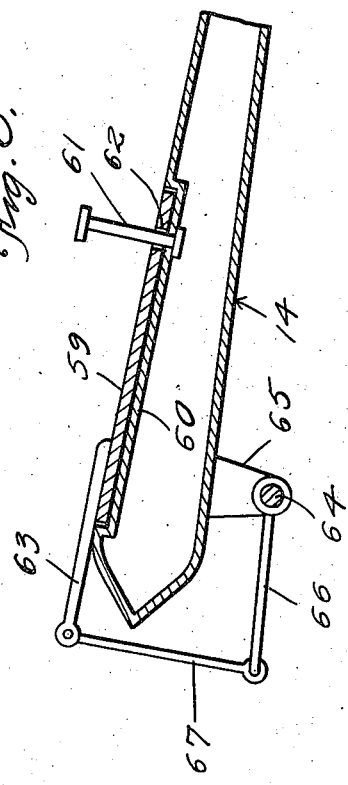
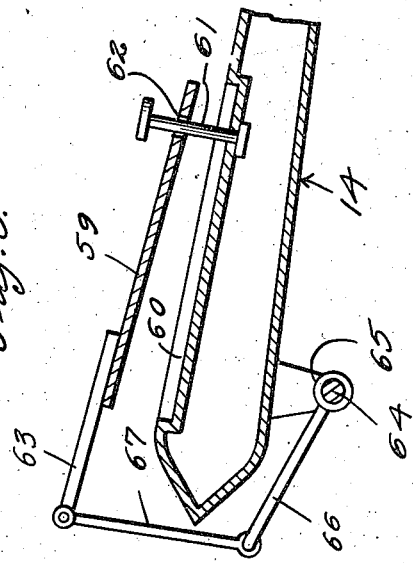
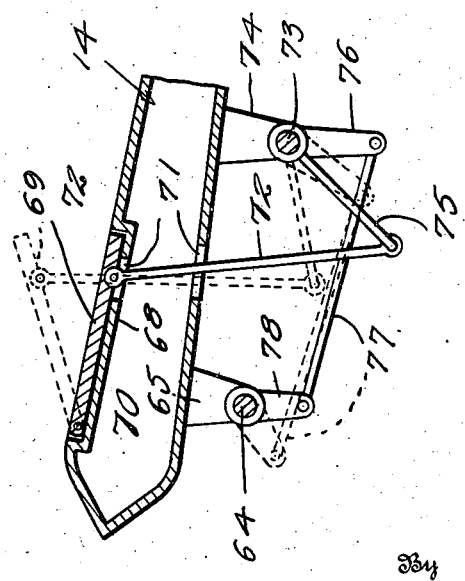
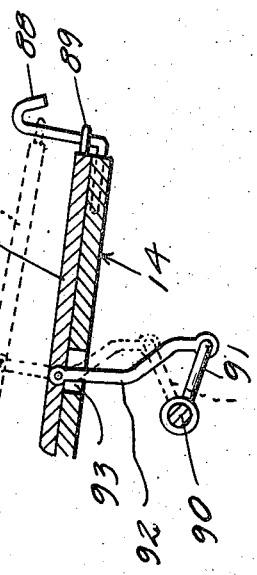

Patented Feb. 11, 1947

2,415,710

UNITED STATES PATENT OFFICE 2,415,710

WING MOUNTED FLAPS

Robert T. Smith, Eufaula, Okla.

Application June 10, 1942, Serial No. 446,500

1 Claim. (Cl. 244—113)

This invention relates to improvements in airplanes and more particularly to airplanes adapted to be used in warfare.

It is a primary object of the invention to provide means for increasing the maneuverability of large airplanes and to enable such airplanes to ascend more rapidly and at slower speed and to descend at slow speed to thus enable, large, heavily laden airplanes to use smaller air fields.

More particularly, it is an aim of the invention to provide a plurality of pusher type propellers for use in conjunction with tractor type propellers of airplanes, which pusher type propellers are mounted to be swung to positions facing either upwardly or downwardly or forwardly or rearwardly of an airplane on which they are mounted to enable them to function to check the forward motion of the airplane, to increase its forward motion, to force the airplane downwardly, or to force the airplane upwardly.

Still another object of the invention is to provide sets of flaps controlled by common operating means from within the airplane and which are adapted to be simultaneously opened for checking the forward motion of the airplane and for lifting the forward end thereof.

Still another object of the invention is to provide an airplane equipped with various types of guns mounted in the nose, the wing tips, the fuselage and the tail thereof.

Other objects and advantages of the invention will hereinafter become more fully apparent from the following description of the drawings, which illustrate a preferred embodiment thereof, and wherein:

Figure 1 is a top plan view of an airplane constructed in accordance with the invention, Figure 2 is an enlarged side elevational view, partly in section of the same, Figure 3 is a fragmentary longitudinal sectional view of a portion of the bottom of the airplane, Figure 4 is a cross sectional view of said portion, taken substantially along a plane as indicated by the line 4—4 of Figure 3, Figure 5 is an enlarged longitudinal vertical sectional view taken substantially along the plane of the line 5—5 of Figure 1, Figure 6 is an enlarged horizontal sectional view of a portion of the airplane, taken substantially along a plane as indicated by the line 6—6 of Figure 5, Figure 7 is a fragmentary horizontal sectional view taken substantially on the same horizontal plane as Figure 6, Figure 8 is a vertical sectional view taken substantially along the plane of the line 8—8 of Figure 6, Figure 9 is a similar view but showing the flap of Figure 8 in an open position.

Figure 10 is an enlarged vertical sectional view taken substantially along the plane of the line 10—10 of Figure 1, and Figure 11 is a vertical sectional view taken substantially along the plane of the line 11—11 of Figure 6.

Referring more particularly to the drawings, wherein like reference characters designate like or corresponding parts throughout the different views, 12 designates generally an airplane constructed in accordance with the invention, of the monoplane type, and which includes a fuselage, designated generally 13, and a wing, designated generally 14. The fuselage 13 includes a cabin 15 having windows 16 and doors 17.

Disposed in the nose 18 of the fuselage 13 and forwardly of the cabin 15 is an upper gunner's cockpit 19 and a lower machine gunner's cockpit 20. The cockpit 19 is provided with a rotatably mounted turret 21 supported for rotation on ball bearings 22 and having a top 23 of glass or other transparent material. The turret 21 is provided with a gun slot 24 through which projects an anti-aircraft gun 25 which is mounted for swinging movement relatively to the slot 24. The front cockpit 19 also preferably contains a gun rack 26. Cockpits 19 and 20 are separated from the forward end of the cabin 15 by a wall or partition 27 and the cockpit 20 is disposed beneath the cockpit 19 and is provided at its forward end with a window 28 and in the sides thereof with portholes 29 for machine guns, not shown. The cockpit 20 has a door 30 at each side thereof opening outwardly of the fuselage and a trap door 31 which connects the cockpits 19 and 20. The doors 30 open outwardly onto catwalks 32 and ladders 33 lead upwardly from said catwalks and onto the wing 14. A compartment 34 is disposed in the fuselage 13 below the cabin 15 and the cockpit 20 and is likewise provided with a plurality of ports 29 in each side thereof in which machine guns are adapted to be positioned. The compartment 34 connects with the cockpit 20 by an opening 35 down from which leads a ladder 36. In the forward end of the compartment 34 is mounted a cannon 37 which projects outwardly through a slot 38 and which is mounted for swinging movement relatively thereto.

Mounted in the leading edge of the wing 14 are four motors 39, two of which are positioned on each side of the fuselage 13. Each of the motors 39 is provided, beyond its forward end, with a tractor type propeller 40. The trailing edge of the wing 14 is provided with recesses 41 on each side of the fuselage 13. A shaft 42 extends longitudinally of the wing 14 and transversely through the cabin 15 and longitudinally through the recess portions 41. The shaft 42 is journaled in bearings 43, mounted in the wing 14, and in bearings 44, which are supported by the wing and which extends into the recesses 41. The shaft 42 is provided with spaced clamps or attaching means 45 of any suitable construction, in each of which is mounted a motor 46. The motors 46 are disposed directly behind the motors 39 and are each provided with a pusher type propeller 47 at one end thereof and a counterbalancing weight 48 at its opposite end.

Referring particularly to Figure 7, a bevelled gear 49 is keyed to the portion of the shaft 42, which extends through the cabin 15, and meshes with a bevelled gear 49' which is keyed to one end of a shaft 50, which is disposed within the cabin 15 and which is supported by and journaled in bearings 51 and 52, which are attached to a side wall of the cabin 15. A shaft 53 is journaled in an angular extension 54 of the bearing 51 and in a bearing 55 and is provided with a bevelled gear 56 which meshes with a bevelled gear 57, keyed to the opposite end of the shaft 50. The shaft 53 is provided with a hand wheel 58 which is adapted to be manually turned for rotating the motor shaft 42, for a purpose which will hereinafter be described.

Referring particularly to Figures 1, 8 and 9, on each side of the fuselage 13 and in the upper part of the wing 14 is mounted a flap 59. The flaps 59 are disposed longitudinally of the wing 14 and are normally nested in recesses 60 in the upper side thereof. A pair of rods 61 extend upwardly from each of the recesses 60 and the flaps 59 are provided with openings 62, adjacent their trailing edges, for loosely engaging the rods 61. A pair of arms 63 are attached to the upper side of each of the flaps 59 and project beyond the leading edge thereof and to beyond the leading edge of the wing 14. A shaft 64 extends transversely through the fuselage 13 and is disposed beneath and longitudinally of the wing 14 and is journaled in brackets 65 which depend from the wing. A plurality of crank arms 66 are keyed to and project forwardly from the shaft 64. Each of the crank arms 66 is connected at its forward end to the forward end of an arm 63 by means of a link 67 which is pivotally connected to said arms 63 and 66.

Beyond the flaps 59, the wing 14 is provided with recesses 68 in its upper side in which are adapted to be nested flaps 69. The flaps 69 are pivotally mounted in the wing 14 at their leading edges by rods or shafts 70. The wing 14 is provided with openings 71 which extend therethrough and which open into the recesses 68, as best seen in Figure 10. One or a plurality of links 72 are pivotally connected to the underside of each of the flaps 69, adjacent its trailing edge, and extend downwardly therefrom through an opening or openings 71. A shaft 73 is disposed behind each end of the shaft 64 and longitudinally of the wing 14 and is journaled in brackets 74 which depend from the wing. Each shaft 73 is provided with one or a plurality of crank arms 75 which project downwardly and forwardly therefrom and to the free end of which is pivotally connected the lower end of one of the links 72. The shafts 73 are also provided with depending crank arms 76 to the lower ends of which are pivotally connected the rear ends of links 77. The shaft 64 has depending crank arms 78 keyed thereto and to the lower ends of which are pivotally connected the forward ends of the links 77, for a purpose which will hereinafter be described.

A shaft 79 extends transversely through the cockpit 19 and is journaled in the sides of the fuselage 13, as best seen in Figure 6. The ends of the shaft 79 project outwardly from the fuselage 13 and have flaps 80 fixedly connected thereto and projecting forwardly therefrom. As seen in Figure 6, the shaft 64 extends transversely through the forward part of the cabin 15 and the portion thereof which is disposed in the cabin has crank arms 81 and 82 keyed thereto and projecting upwardly therefrom. The flaps 80 are provided, adjacent their forward ends and inner edges, with upwardly projecting eye screws 83 to each of which is pivotally connected an end of a link 84. The links 84 extend rearwardly through slots 85 in the sides of the fuselage 13 and through slots 86 in the wall 27 and one of said links is pivotally connected at its opposite end to the free end of the crank arm 81 and the other of said links is pivotally connected at its rear end to the free end of the crank arm 82.

A flap 87 is mounted on the trailing edge portion of the wing 14, adjacent to and at each side of the fuselage 13. As best seen in Figure 11, the trailing edge of the wing 14 is provided with upwardly projecting hook-shaped members 88 and the trailing edges of the flap 87 are provided with eyes 89 for slidably engaging the shanks of the members 88. A shaft 90 extends transversely through the cabin 15 and is journaled in the sides of the fuselage 13. The ends of the shaft 90 are disposed beneath the flap 87 and are provided with crank arms 91 to each of which is pivotally connected a link 92. Links 92 extend upwardly through openings 93 in the wing 14 and are pivotally connected at their opposite ends to the flaps 87, near their leading edges.

As best seen in Figure 6, a crank arm 94 is keyed to the shaft 90 and projects downwardly therefrom and is disposed in the cabin 15. A link 95 is pivotally connected at its forward end to the crank arm 82 and at its rear end to the crank arm 94. A lever 96 is keyed to the shaft 64 and is disposed within the cabin 15 and is adapted to be manually operated for turning the shaft 64. When the shaft 64 is thus turned in a clockwise direction, as seen in Figures 2 and 10, the crank arms 66 will be swung upwardly to raise the flaps 59 to the position, as seen in Figure 9. Likewise, the cranks 78 will be swung forwardly to swing the cranks 76 forwardly, so as to swing the crank arms 75 upwardly to raise the flaps 69 to their dotted line positions of Figure 10. The same turning movement of the shaft 64 will also rock the crank arms 81 and 82 rearwardly to raise the forward ends of the flaps 80 and will turn the shaft 90 in the opposite direction, through the link connection 95 for raising the forward end of the flap 87. It will be readily apparent that the flaps 59, 80 and 87, when thus elevated, will tend to check the forward speed of the airplane 12 and to lift the nose thereof for pulling the airplane out of a nose dive or for checking its forward momentum to enable it to land at a slower speed. By returning the lever 96 to its original position, the flaps will all be returned to their nested positions and the flaps 69 will function to assist in turning the shafts 64 in a counterclockwise direction as the pressure of the wind on the upper sides thereof tends to force the flaps 69 back to nested positions.

Gun emplacements 97 are mounted on the upper sides of the tips of the wing 14 and on the tail 98 of the airplane 12 and include doors 99, windows 100 and machine gun ports 101. Also, from each of the gun emplacements 97 projects a cannon 102.

Referring particularly to Figs. 1 and 2, the fuselage 13 is provided in its upper part and behind the cabin 15 with an aircraft gunner's cockpit 103 containing one or more aircraft guns 104 and which is adapted to be closed by means of a sliding hatch 105 which is mounted on suitable ball bearings. Rearwardly of the cockpit 103 are catwalks 106 upwardly from which lead ladders 107 which afford access to the cockpit 103.

Beneath the cockpit 103 is a compartment 108, as seen in Figure 2, in which is mounted a storage battery 109, an air pump 110, an air storage tank 111 and a gas storage tank 112, which parts may be of any suitable construction. An air inlet pipe 113 having a check valve 114 is connected to one side of the pump 110 and a conduit 115, provided with a shut-off valve, connects the other side of the pump to the tank 111. The tanks 111 and 112 are connected by a conduit 116 and a conduit 117 leads from the tank 112. The conduits 116 and 117 are likewise provided with suitable shut-off valves, as seen in Figure 2. The conduit 117 leads along the underside of the rear portion of the fuselage 13 and connects with gas guns 118 which project from the rear end of the airplane. Branch conduits 119 are also connected to the tank 112 or its conduit 117, at any suitable point, now shown, may be provided for controlling the mo-and have ends which open beneath the cannon 102. Electric conductors 120 lead from the storage battery 109 to the outlet of each of the branch pipes 119, so that when the tank 112 contains an inflammable gas, the gas can be ignited by a spark from the conductors 120 so that the cannons 37 and 102 and the guns 118 can be utilized as flame throwers.

Beneath the fuselage 13 between the forward ground wheels of the airplane 12 is located a torpedo or bomb rack 121 which may be of any suitable construction. The bomb rack 121, as best seen in Figures 3 and 4, is illustrated as being provided with an open forward end 122, adapted to be normally closed by means of a lever-operated valve or shutter 123 which can be operated from within the compartment 34, and preferably includes a trap door 124 which opens into the compartment 34. Suitable means, not shown, may be provided for projecting a bomb or torpedo, not shown, outwardly through the open forward end 122 when the valve or shutter 123 is in an open position.

Referring back to the motors 46, as seen in Figures 1 and 2, the blades of the propellers 47 thereof are pitched in the opposite direction to the blades of the propellers 40 so that when the propellers 47 are being driven and are in the positions, as seen in Figures 1 and 2, the tendency will be to drive the airplane 12 rearwardly so as to check the forward motion thereof and to act against the action of the propellers 40. By turning the hand wheel 58 in one direction the shaft 42 will be turned for moving the motors 46 and propellers 47 from their positions in Figures 1 and 2 to positions in which the propellers 47 are in substantially horizontal planes and beneath the wing 14, and when thus disposed the propellers 47 will function efficiently for lifting the airplane 12 to thereby enable it to ascend much more rapidly and while moving at a much slower forward speed than would be possible for the airplane to otherwise ascend by the use of the propellers 40 only. Also, the airplane 12 could be assisted in ascending by opening the flaps and their tendency to check the forward motion of the airplane will not create any risk of the motors 39 stalling, resulting in a tail spin, due to the fact that substantially all of the weight of the airplane 12 will be supported by the power exerted by the propellers 47. Also, by turning the shaft 42 in the opposite direction, by operation of the hand wheel 58, the propellers 47 can be moved from their positions of Figures 1 and 2 to positions in horizontal planes above the wing 14 so that the propellers 47 will then act to force the airplane downwardly. In addition, the shaft 42 can be turned to swing the motors 46 through an arc of one hundred and eighty degrees from their positions of Figures 1 and 2 so that the propellers 47 will then be facing to the rear, in which position they will function as pusher type propellers to assist the propellers 40 in driving the airplane 12 in a forward direction. Obviously, suitable means, not shown, may be provided for controlling the motors 46 so that they can be operated only when needed.

Various modifications and changes are contemplated and may obviously be resorted to, provided they fall within the spirit and scope of the invention as hereinafter defined by the appended claim, as only a preferred embodiment of the invention has been disclosed.

I claim as my invention:

An aircraft having flaps mounted in a wing thereof, said wing having recesses in its upper side for receiving the flaps, rods projecting upwardly from the wing and through the trailing edge portion of certain of the flaps, said portions being slidably mounted on the rods, a shaft journaled beneath the wing, and link and lever means for connecting the shaft to the leading edges of said last mentioned flaps whereby the flaps will be raised when the shaft is turned in one direction, and lowered when the shaft is turned in the opposite direction other of the flaps being pivotally connected to the wing at their leading edges, and link and lever means actuated by the shaft for raising and lowering the pivoted flaps simultaneously with the aforementioned flaps, said pivoted flaps functioning to urge said other flaps toward nested positions

ROBERT T. SMITH.

REFERENCES CITED

The following references are of record in the file of this patent:

UNITED STATES PATENTS

| Number | Name | Date |
|---|---|---|
| 1,916,813 | Sessa | July 4, 1933 |
| 1,862,421 | O'Malley | June 7, 1932 |
| 2,005,965 | Barnhart | June 25, 1935 |
| 2,041,688 | Barnhart | May 26, 1936 |
| 2,049,188 | Alfaro | July 28, 1936 |
| 1,758,355 | Cottrell et al. | May 13, 1930 |
| 1,752,012 | Lauchin | Mar. 25, 1930 |
| 1,805,770 | Kelly | May 19, 1931 |
| 1,935,824 | Upson | Nov. 21, 1933 |

FOREIGN PATENTS

| Number | Country | Date |
|---|---|---|
| 332,145 | German | Jan. 24, 1921 |